US012055899B2

(12) United States Patent
Oikawa

(10) Patent No.: US 12,055,899 B2
(45) Date of Patent: Aug. 6, 2024

(54) WATCH, POINTER CONTROL METHOD, AND NON-TRANSITORY RECORDING MEDIUM

(71) Applicant: CASIO COMPUTER CO., LTD., Tokyo (JP)

(72) Inventor: Shuto Oikawa, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 442 days.

(21) Appl. No.: 17/469,108

(22) Filed: Sep. 8, 2021

(65) Prior Publication Data

US 2022/0075323 A1 Mar. 10, 2022

(30) Foreign Application Priority Data

Sep. 10, 2020 (JP) ................................ 2020-152057

(51) Int. Cl.
*G04B 47/06* (2006.01)
*G04C 3/14* (2006.01)
*G04G 9/00* (2006.01)

(52) U.S. Cl.
CPC ............... *G04B 47/06* (2013.01); *G04C 3/14* (2013.01); *G04G 9/0005* (2013.01)

(58) Field of Classification Search
None
See application file for complete search history.

(56) References Cited

U.S. PATENT DOCUMENTS

2017/0075306 A1* 3/2017 Morohoshi .............. G04G 3/00
2018/0120773 A1* 5/2018 Hasegawa .............. G04C 17/00

FOREIGN PATENT DOCUMENTS

CN 106527096 A 3/2017
JP 2002-328184 A 11/2002
JP 2009-075058 A 4/2009
JP 2013-205167 A 10/2013
JP 2014-032067 A 2/2014
JP 2017-058356 A 3/2017

OTHER PUBLICATIONS

First Office Action dated Nov. 21, 2022 received in Chinese Patent Application No. CN 202111056762.X.
Notice of Reasons for Refusal dated Sep. 20, 2022 received in Japanese Patent Application No. JP 2020-152057.

* cited by examiner

*Primary Examiner* — Renee S Luebke
*Assistant Examiner* — Matthew Hwang
(74) *Attorney, Agent, or Firm* — SCULLY SCOTT MURPHY & PRESSER, PC

(57) ABSTRACT

A watch includes a pointer that rotates and indicates a time, a notifier that performs a notification operation to a user in a mode other than a visual mode, and a processor that controls the rotation of the pointer and the notification operation of the notifier. The processor is configured to control the pointer to cause the pointer to rotate faster than a rotation corresponding to a passage of time and move to a specified position and, when the pointer arrives at a notification position while the pointer is moving fast, control the notifier to cause the notifier to perform the notification operation.

10 Claims, 4 Drawing Sheets

WATCH, POINTER CONTROL METHOD, AND NON-TRANSITORY RECORDING MEDIUM

CROSS-REFERENCE TO RELATED APPLICATION

This application is based upon and claims the benefit of priority under 35 USC 119 of Japanese Patent Application No. 2020-152057, filed on Sep. 10, 2020, the entire disclosure of which, including the description, claims, drawings, and abstract, is incorporated herein by reference in its entirety.

FIELD

This application relates generally to a watch, a pointer control method, and a non-transitory recording medium.

BACKGROUND

Japanese Unexamined Patent Application Publication No. 2017-58356 describes an electronic watch that includes a pointer that is rotatably provided, and a controller that controls the rotation of the pointer. When the pointer is caused to perform a fast-forward movement to a preset target position, the controller performs attenuating repetitive motion control in which, with the fast-forward movement, a predetermined repetitive movement of the pointer with the target position as a reference position is performed while reducing the size of motion of the repetitive movement.

SUMMARY

A watch according to one embodiment includes:

a pointer that rotates and indicates a time;

a notifier that performs a notification operation to a user in a mode other than a visual mode; and a processor that controls the rotation of the pointer and the notification operation of the notifier; wherein the processor is configured to control the pointer to cause the pointer to rotate faster than a rotation corresponding to a passage of time and move to a specified position and, when the pointer arrives at a notification position while the pointer is moving fast, control the notifier to cause the notifier to perform the notification operation.

A pointer control method according to one embodiment is a control method executed by a processor that controls a rotation of a pointer that rotates and indicates a time, and a notification operation of a notifier that performs the notification operation to a user in a mode other than a visual mode, the method including:

controlling the pointer to cause the pointer to rotate faster than a rotation corresponding to a passage of time and move to a specified position and, when the pointer arrives at a notification position while the pointer is moving fast, controlling the notifier to cause the notifier to perform the notification operation.

A non-transitory recording medium according to one embodiment stores a program that causes a computer, that controls a rotation of a pointer that rotates and indicates a time, and a notification operation of a notifier that performs the notification operation to a user in a mode other than a visual mode, to control the pointer to cause the pointer to rotate faster than a rotation corresponding to a passage of time and move to a specified position; and when the pointer arrives at a notification position while the pointer is moving fast, control the notifier to cause the notifier to perform the notification operation.

BRIEF DESCRIPTION OF THE DRAWINGS

A more complete understanding of this application can be obtained when the following detailed description is considered in conjunction with the following drawings, in which.

DETAILED DESCRIPTION

Figure 1:
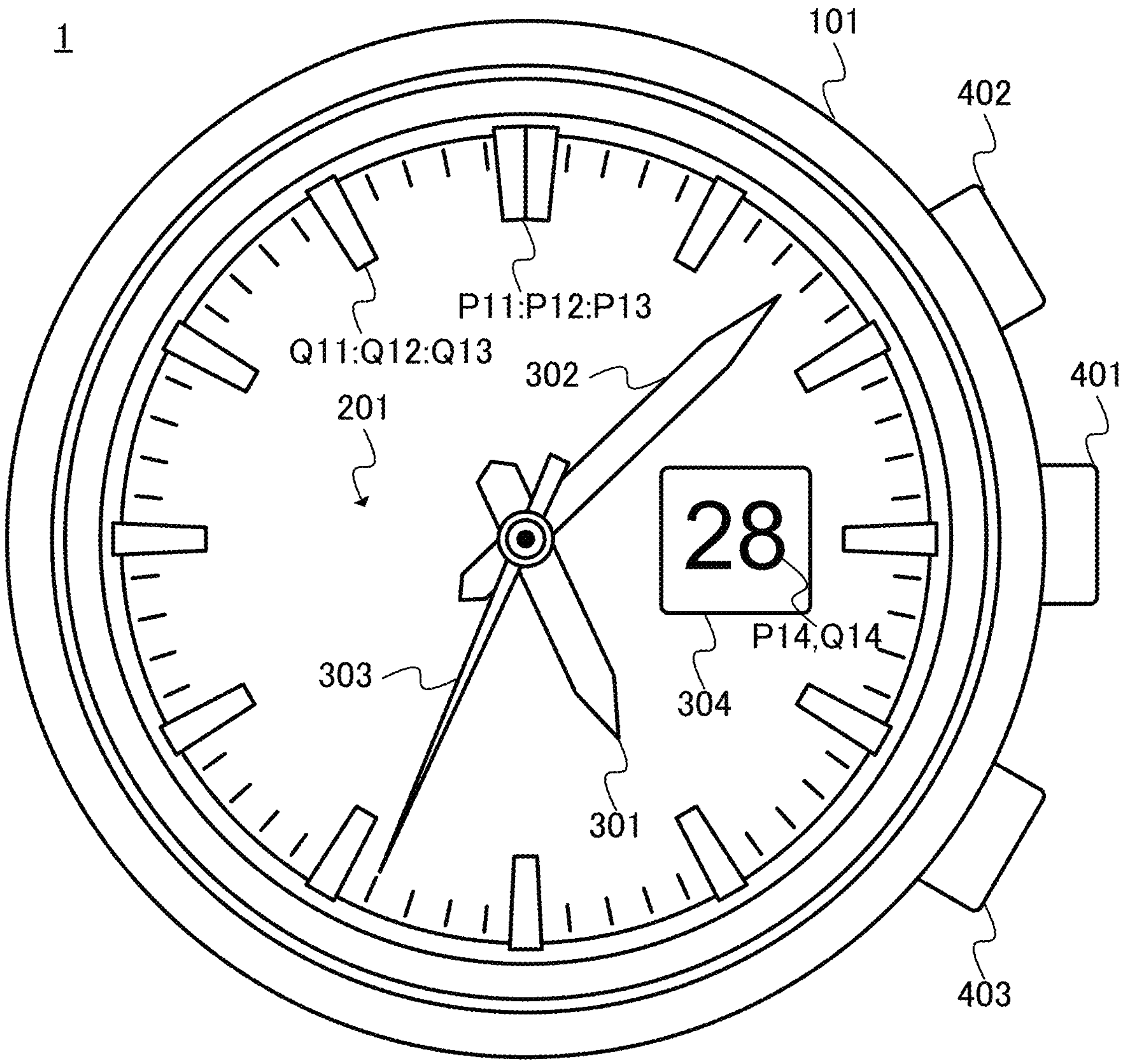
FIG. 1 is a drawing illustrating the appearance of a watch according to Embodiment 1.

Hereinafter, a watch 1 according to Embodiment 1 is described while referencing the drawings. Note that, in the drawings, identical or corresponding components are denoted with the same reference numerals. The watch 1 according to Embodiment 1 is implemented as an electronic watch that displays the date and time using four pointers.

FIG. 1 is a drawing illustrating the appearance of the watch 1 according to Embodiment 1. As illustrated in FIG. 1, the watch 1 includes a case 101, a dial 201, an hour hand 301, a minute hand 302, a second hand 303, a date wheel 304, a winding crown 401, and switches 402, 403.

The case 101 includes a transparent member that enables viewing of the dial 201. The dial 201, the hour hand 301, the minute hand 302, the second hand 303, and the date wheel 304 are disposed in the case 101. The winding crown 401 and the switches 402, 403 are disposed on a side of the case 101. The case 101 can include glass, metal, or resin, but is not limited thereto.

The dial 201 is a circular plate on which signs and scales that indicate the time are provided. A non-illustrated round opening is formed in the center of the dial 201, and a rectangular opening is formed on the three o'clock side of the dial 201.

The hour hand 301, the minute hand 302, and the second hand 303 are pointers that respectively indicate hours, minutes, and seconds. The hour hand 301, the minute hand 302, and the second hand 303 are disposed between the transparent member of the case 101 and the dial 201. The hour hand 301, the minute hand 302, and the second hand 303 are disposed so as to be capable of 360° rotation in planes parallel to each other, about the circular opening of the dial 201. In the present specification, the term "rotation" includes both forward rotation and backward rotation.

The date wheel 304 is a pointer that indicates a date. Numbers from 1 to 31 are equidistantly denoted on the surface of the date wheel 304. The date wheel 304 is formed in a cylindrical shape. The date wheel 304 is disposed so as to be rotatable about an axis parallel to the dial 201. A portion of the surface of the date wheel 304 is exposed through the rectangular opening of the dial 201, and the date is indicated by the number that is exposed through the opening. The hour hand 301, the minute hand 302, the second hand 303, and the date wheel 304 are collectively referred to as pointers. The pointers are also referred to as indicating members.

The winding crown 401 is a switch that receives an input operation from a user. The winding crown 401 is rotatably disposed on a side face of the case 101, on the three o'clock side. The winding crown can be pulled out from the side face in two stages. By rotating the winding crown 401 while the winding crown 401 is pulled-out, the winding crown 401 receives an operation for changing the displayed time.

The switches 402, 403 are push button switches that receive input operations from the user. The switches 402, 403 are pushably disposed on the side face of the case 101, on the two o'clock side and the four o'clock side, respectively. The switches 402, 403 are pressed by a user and, as a result, receive operations for starting hand position correction, starting time correction, switching daylight saving time, and the like. However, the operations to be received are not limited thereto. The winding crown 401 and the switches 402, 403 are collectively referred to as input members.

Figure 2:
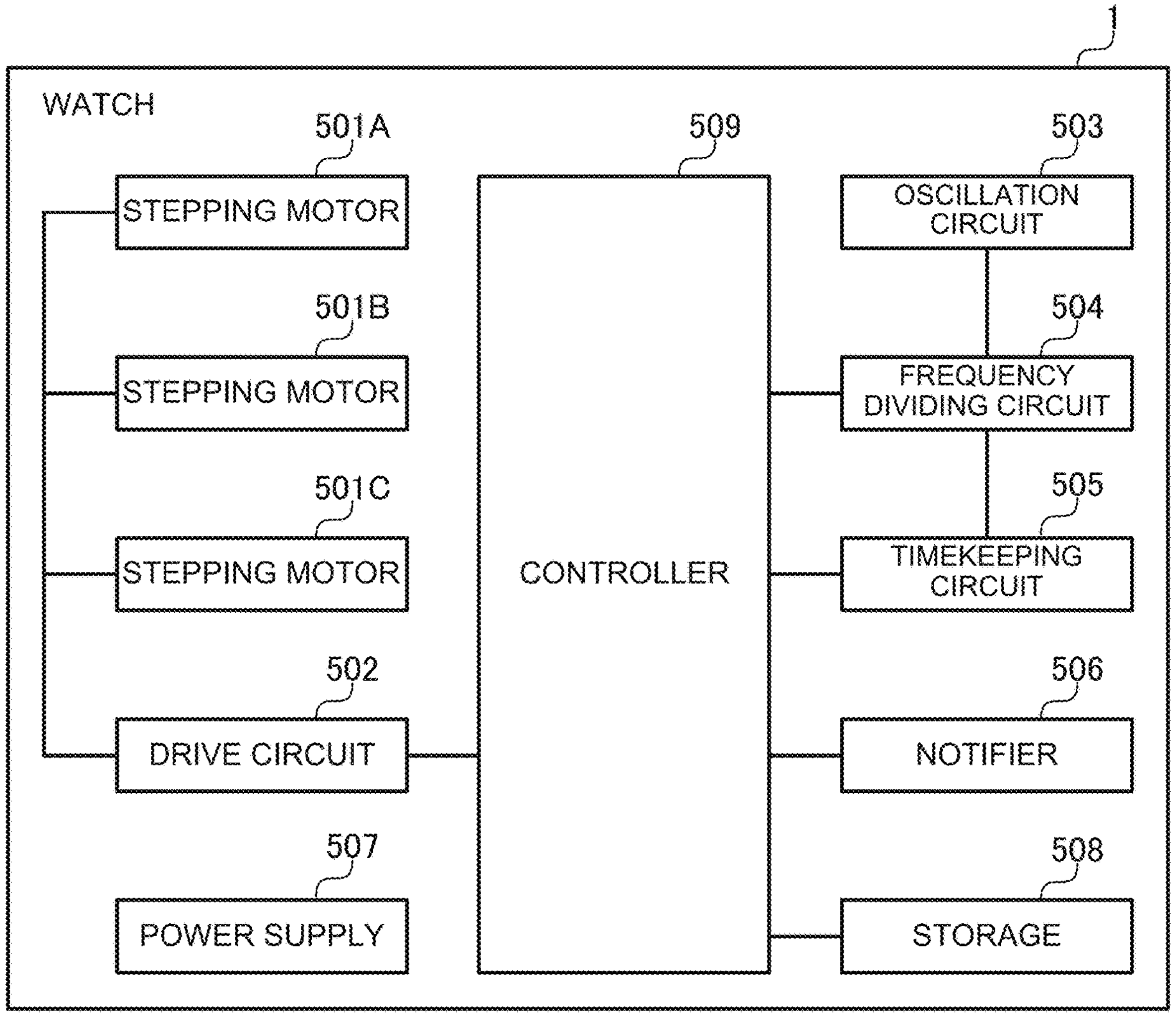
FIG. 2 is a block diagram illustrating the configuration of the watch according to Embodiment 1.

FIG. 2 is a block diagram illustrating the configuration of the watch 1 according to Embodiment 1. As illustrated in FIG. 2, the watch 1 includes stepping motors 501A, 501B, 501C, a drive circuit 502, an oscillation circuit 503, a frequency dividing circuit 504, a timekeeping circuit 505, a notifier 506, a power supply 507, a storage 508, and a controller 509.

The stepping motors 501A, 501B, 501C are respectively connected to the hour hand 301, the minute hand 302, the second hand 303, and the date wheel 304 via gears. The stepping motors 501A, 501B, 501C rotate on the basis of drive signals input from the drive circuit 502, and respectively drive the hour hand 301, the minute hand 302, the second hand 303, and the date wheel 304 to which the stepping motors 501A, 501B, 501C are connected. The stepping motors 501A, 501B, 501C are collectively referred to as stepping motors 501.

The drive circuit 502 is connected to the stepping motors 501, and outputs drive signals to drive the stepping motors 501.

The oscillation circuit 503 generates and outputs unique frequency signals to the frequency dividing circuit 504. In one example, the oscillation circuit 503 includes a crystal oscillator, but is not limited thereto.

The frequency dividing circuit 504 divides the frequency signals output from the oscillation circuit 503, and outputs these signals to the timekeeping circuit 505 and the controller 509.

The timekeeping circuit 505 measures the time by adding an amount of time to an initial time input from the controller 509. The timekeeping circuit 505 counts the current time by counting the number of frequency signals output from the frequency dividing circuit 504, and adding the counted number to the initial time.

The notifier 506 performs, on the basis of a notification signal input from the controller 509, a notification operation in a mode different from a visual mode and that includes sound, vibration, or the like, and notifies the user. The notifier 506 can include a buzzer and/or a vibrator, but is not limited thereto.

The power supply 507 supplies power to the stepping motor 501, the drive circuit 502, the oscillation circuit 503, the frequency dividing circuit 504, the timekeeping circuit 505, the notifier 506, the storage 508, and the controller 509. The power supply 507 can include a primary battery, a secondary battery, and/or a solar cell, but is not limited thereto. In FIG. 2, the connection wires of the power supply 507 are not illustrated.

The storage 508 is implemented as a non-transitory recording medium that stores programs to be executed by the controller 509, and initial data and position data to be used by the programs. The storage 508 can include read-only memory (ROM) and/or random access memory (RAM), but is not limited thereto.

The controller 509 controls the entire watch 1 by executing the programs stored in the storage 508. The controller 509 can include a central processing unit (CPU), but is not limited thereto. The controller 509 is also referred to as control device 509 or processor 509.

When there is an instruction by a user input or when predetermined, the controller 509 performs an operation for fast-forward moving the pointers. Specifically, the controller 509 outputs a control signal to the drive circuit 502, controls the drive circuit 502 to output a drive signal, and causes the stepping motors 501 to drive, thereby causing the pointers to rotate faster than normal timekeeping operation.

Next, processing whereby the controller 509 causes the hour hand 301, the minute hand 302, and/or the second hand 303 to fast-forward move to specified positions is described. In one example, the specified position is 12 o'clock (zero minutes, zero seconds), but is not limited thereto.

The controller 509 outputs a control signal to the drive circuit 502, and causes the hour hand 301, the minute hand 302, and the second hand 303 to fast-forward move respectively to specified positions P11, P12, P13. As described above, the specified positions P11, P12, P13 are respectively the 12th hour, 0 minutes, and 0 seconds positions.

When the hour hand 301, the minute hand 302, and the second hand 303 all arrive at the specified positions P11, P12, P13, respectively, the controller 509 outputs a notification signal to the notifier 506, and causes the notifier 506 to notify the user that all of the hour hand 301, the minute hand 302, and the second hand 303 have arrived at the specified positions P11, P12, P13, respectively. The specified positions P11, P12, P13 are positions at which the controller 509 causes the notifier 506 to perform the notification operation, and are also respectively referred to as notification positions Q11, Q12, Q13.

In a case in which, regardless of the hour hand 301, the minute hand 302, and the second hand 303 having been caused to move to the 12th hour, zero minutes, and zero seconds positions by the controller 509, the actual positions of the hour hand 301, the minute hand 302, and the second hand 303 are offset from those positions, the user operates the winding crown 401 or the switches 402, 403 to move the offset positions of the hour hand 301, the minute hand 302, and/or the second hand 303 to the 12th hour, zero minutes, and zero seconds positions. As a result of performing this operation, it is possible to perform hand position correction for causing the hour hand 301, the minute hand 302, and the second hand 303 to move to the correct positions.

After a set amount of time has elapsed from the arrival of the hour hand 301, the minute hand 302, and the second hand 303 at the respective specified positions P11, P12, P13, the controller 509 ignores user inputs from the winding crown 401 and the switches 402, 403. That is, operations performed on the winding crown 401 and the switches 402, 403 are disabled. Note that an input to cancel the disabling of the operations can be received. The amount of time until the disabling of the operations may be set at the factory, may be set by the controller 509, or may be set by the user, but is not limited thereto.

After the set amount of time has elapsed from the arrival of the hour hand 301, the minute hand 302, and the second hand 303 at the respective specified positions P11, P12, P13, the controller 509 causes the hour hand 301, the minute hand 302, and the second hand 303 to move to positions indicating the current time, and to perform an operation for indicating the time.

Figure 3:
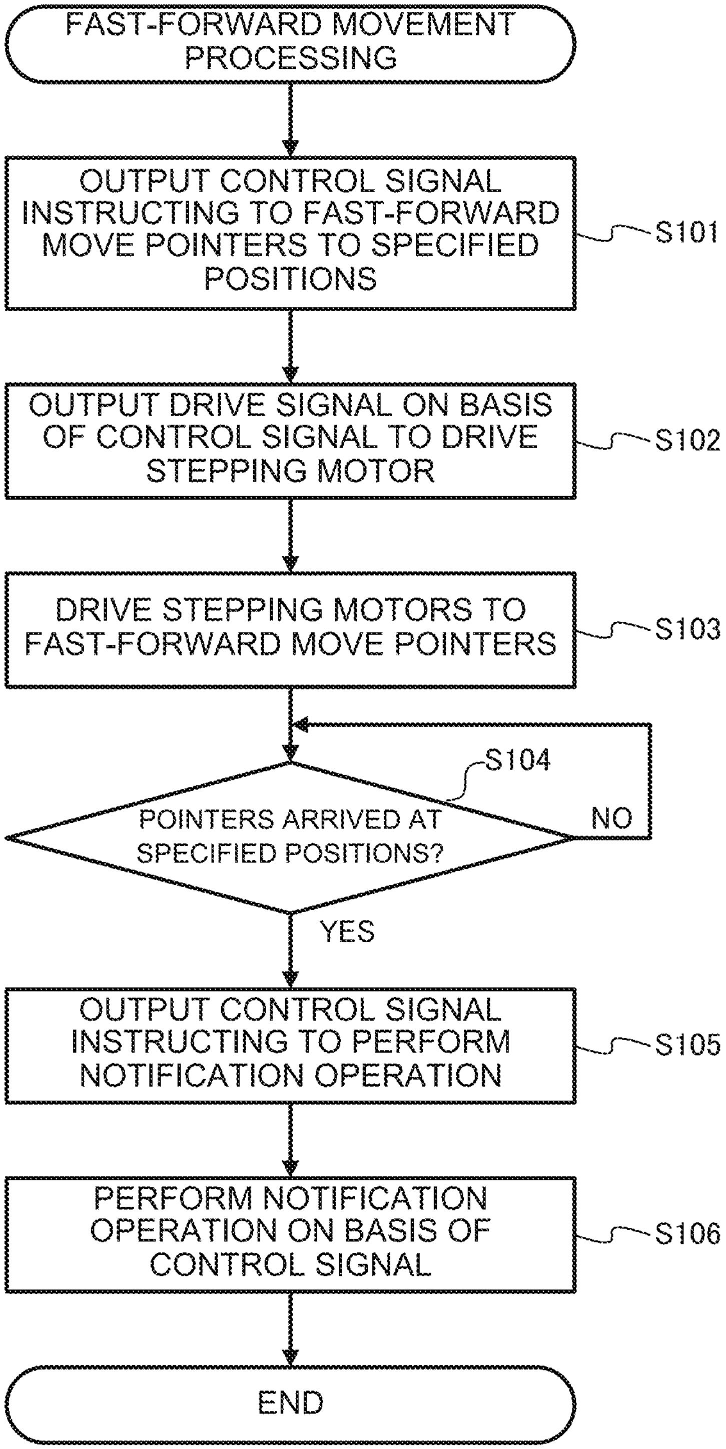
FIG. 3 is a flowchart of hand fast-forward movement processing that is executed by a controller of the watch according to Embodiment 1.

FIG. 3 is a flowchart of hand fast-forward movement processing that is executed by the controller 509 of the watch 1 according to Embodiment 1. The fast-forward movement processing is described while referencing the flowchart of FIG. 3.

When the fast-forward movement processing starts, the controller 509 outputs, to the drive circuit 502, a control signal instructing the drive circuit 502 to cause the hour hand 301, the minute hand 302, and the second hand 303 to fast-forward move to the respective specified positions P11, P12, P13 (step S101).

When the controller 509 outputs the control signal, the drive circuit 502 receives the control signal and outputs drive signals on the basis of the control signal to drive the stepping motors 501 (step S102).

When the drive circuit 502 outputs the drive signals, the stepping motor 501A and the stepping motor 501B drive to fast-forward move each of the hour hand 301, the minute hand 302, and the second hand 303 (step S103).

When the stepping motor 501A and the stepping motor 501B drive the hour hand 301, the minute hand 302, and the second hand 303, the controller 509 determines whether all of the hour hand 301, the minute hand 302, and the second hand 303 have arrived at the specified positions P11, P12, P13 (step S104). When the controller 509 determines that all of the hour hand 301, the minute hand 302, and the second hand 303 have not arrived (step S104; NO), the controller 509 repeats step S104 until a determination is made that all have arrived.

When the controller 509 determines that all of the hour hand 301, the minute hand 302, and the second hand 303 have arrived (step S104; YES), the controller 509 outputs, to the notifier 506, a control signal instructing that a notification operation is to be performed (step S105).

When the controller 509 outputs the control signal, the notifier 506 receives the control signal, performs the notification operation on the basis of the control signal (step S106), and ends the fast-forward movement processing.

As a result of being provided with the configuration described above and executing the fast-forward movement processing, the watch 1 according to Embodiment 1 can notify the user that the fast-forward movement of the pointers has ended, without causing the user the look at the watch 1.

In a case in which the pointers are moved to positions other than positions indicating the current time, the pointers are fast-forward moved. However, since there is a limit to the movement speed of the pointers, an extended period of time may be required depending on the type of the pointer to be moved or the positions to which the pointers are to be moved. In a case in which a thin watch is formed, the number of steps needed to move the pointers one full rotation increases, and the amount of time needed for the movement increases. Continuously observing the watch until the fast-forward movement ends is inconvenient to the user, and the user may miss the end of the fast-forward movement.

The watch 1 according to Embodiment 1 notifies the user in a mode other than a visual mode that the fast-forward movement of the pointers has ended and, as such, the inconvenience of the user needing to continuously observe the watch to confirm the end of the fast-forward movement can be eliminated. Furthermore, the possibility of the user not noticing the end of the fast-forward movement can be reduced.

The watch 1 according to Embodiment 1 can prevent misoperations by the user by disabling the operations of the input devices after a set amount of time has elapsed from the end of the fast-forward movement of the pointers.

The watch 1 according to Embodiment 1 causes the pointers to move to positions that indicate the current time after the set amount of time has elapsed from the end of the fast-forward movement of the pointers, and causes an operation for indicating the time to be performed. As a result, it is possible to prevent the user from mistaking that a failure or the like has occurred and that the correct time is no longer being indicated. Additionally, it is possible to prevent increases in power consumption caused by the performance of operations different from normal timekeeping, and it is also possible to prevent voltage drops and operation abnormalities from occurring.

Next, a watch 1 according to Embodiment 2 is described while referencing the drawings. The configuration of the watch 1 according to Embodiment 2 is the same as that of the watch 1 according to Embodiment 1.

Next, processing whereby the controller 509 of the watch 1 according to Embodiment 2 causes the date wheel 304 to fast-forward move to a specified position is described. In one example, the specified position is the 1st, but is not limited thereto.

The controller 509 outputs a control signal to the drive circuit 502, and causes the date wheel 304 to fast-forward move to a specified position P14. As described above, the specified position P14 is the position of the 1st.

When the date wheel 304 advances 31/360°, that is, an amount corresponding to one day, the controller 509 outputs a notification signal to the notifier 506, and causes the notifier 506 to notify the user that the date wheel 304 has advanced an amount corresponding to one day. The controller 509 repeats the notification every 31/360° until the date wheel 304 arrives at the specified position P14. In other words, a position of every one day from the initial position of the date wheel 304 to the specified position P14 is a notification position Q14 at which the controller 509 causes the notifier 506 to perform the notification operation. The initial positon is the position at which the date wheel 304 is located before being caused to move to the specified position P14.

In a case in which, regardless of the date wheel 304 having been caused to move to the position of the 1st by the controller 509, the actual position of the date wheel 304 is offset from the 1st, the user operates the winding crown 401 or the switches 402, 403 to cause the offset position of the date wheel 304 to move to the position of the 1st. As a result of performing this operation, it is possible to perform hand position correction for causing the date wheel 304 to move to the correct position.

After a set amount of time has elapsed from the arrival of the date wheel 304 at the specified position P14, the controller 509 ignores user inputs from the winding crown 401 and the switches 402, 403. That is, operations performed on the winding crown 401 and the switches 402, 403 are disabled. Note that an input to cancel the disabling of the operations can be received.

After the set amount of time has elapsed from the arrival of the date wheel 304 at the specified position P14, the controller 509 causes the date wheel 304 to move to a position indicating the current date, and to perform an operation for indicating the date.

Figure 4:
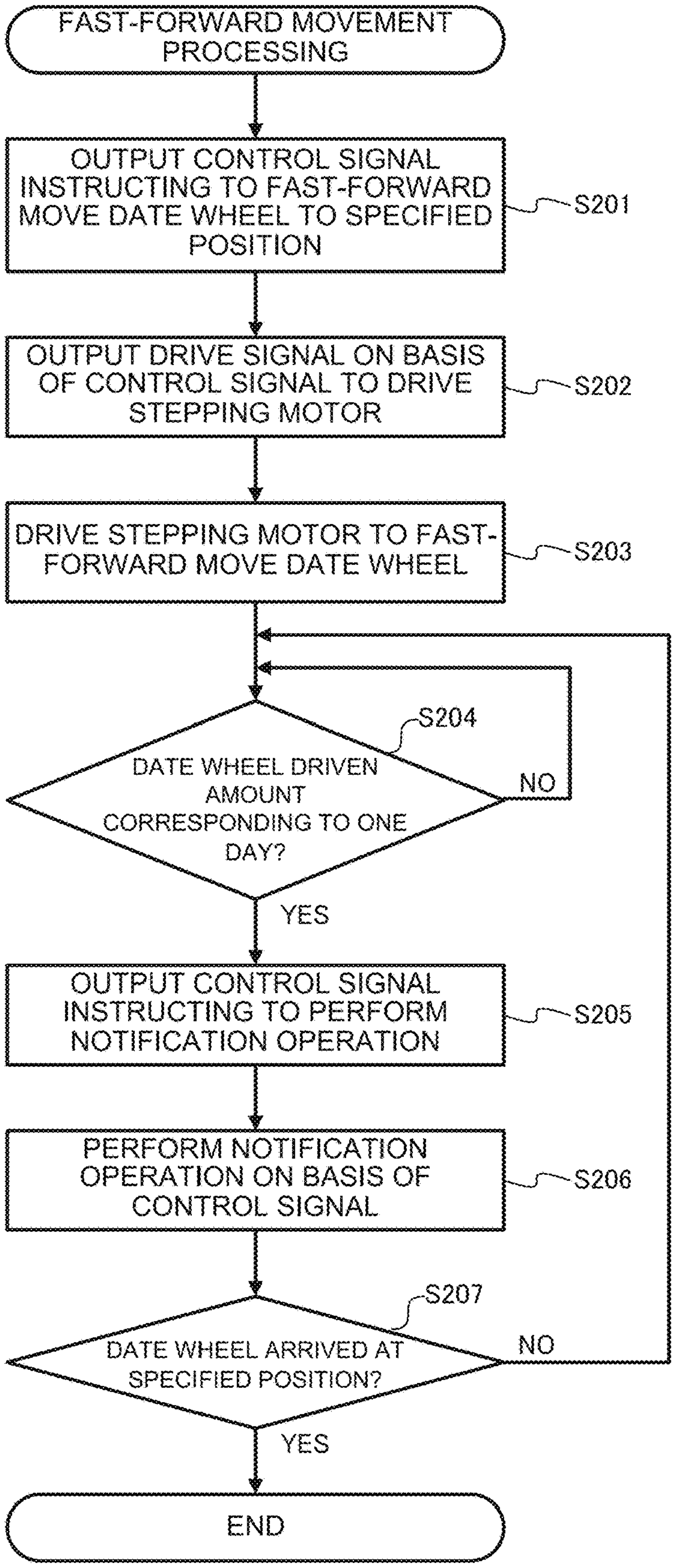
FIG. 4 is a flowchart of hand fast-forward movement processing that is executed by a controller of a watch according to Embodiment 2.

FIG. 4 is a flowchart of hand fast-forward movement processing that is executed by the controller 509 of the watch 1 according to Embodiment 2. The fast-forward movement processing is described while referencing the flowchart of FIG. 4.

When the fast-forward movement processing starts, the controller 509 outputs, to the drive circuit 502, a control signal instructing the drive circuit 502 to cause the date wheel 304 to fast-forward move to the specific position P14 (step S201).

When the controller 509 outputs the control signal, the drive circuit 502 receives the control signal and outputs a drive signal on the basis of the control signal to drive the stepping motor 501C (step S202).

When the drive circuit 502 outputs the drive signal, the stepping motor 501C drives to fast-forward move the date wheel 304 (step S203).

When the stepping motor 501C drives the date wheel 304, the controller 509 determines whether the date wheel 304 has been driven an amount corresponding to one day (step S204). When the controller 509 determines that the date wheel 304 has not been driven an amount corresponding to one day (step S204; NO), step S204 is repeated until a determination is made that the date wheel 304 has been driven an amount corresponding to one day.

When the controller 509 determines that the date wheel 304 has been driven an amount corresponding to one day (step S204; YES), the controller 509 outputs a control signal to the notifier 506 instructing the notifier 506 to perform the notification operation (step S205).

When the controller 509 outputs the control signal, the notifier 506 receives that control signal and performs the notification operation on the basis of that control signal (step S206).

When the notifier 506 performs the notification operation, the controller 509 determines whether the date wheel 304 has arrived at the specified position P14 (step S207). When a determination is made that the date wheel 304 has not arrived (step S207; NO), step S204 is executed. When a determination is made that the date wheel 304 has arrived (step S207; YES), the fast-forward movement processing is ended.

As a result of being provided with the configuration described above and executing the fast-forward movement processing, the watch 1 according to Embodiment 2 demonstrates the same advantageous effects as the watch 1 according to Embodiment 1.

With the watch 1 according to Embodiment 2, in the fast-forward movement of the date wheel 304 in which rotation is slower than and requires more time than the hour hand 301, the minute hand 302, and the second hand 303, the notification is performed each time the date wheel 304 is advanced an amount corresponding to one day. As such, the possibility of the user not noticing the end of the fast-forward movement or forgetting that fast-forward movement has been performed can be reduced.

Next, a watch 1 according to Embodiment 3 is described. The configuration of the watch 1 according to Embodiment 3 is the same as that of the watch 1 according to Embodiment 1.

Next, processing whereby the controller 509 of the watch 1 according to Embodiment 3 fast-forward moves the hour hand 301, the minute hand 302, and the second hand 303 to specified positions is described. In one example, the specified positions are positions indicating a current time acquired from an external device, but are not limited thereto.

The controller 509 outputs a control signal to the drive circuit 502, and causes the hour hand 301, the minute hand 302, and the second hand 303 to fast-forward move respectively to specified positions P21, P22, P23. When the hour hand 301, the minute hand 302, and the second hand 303 respectively arrive at the specified positions P21, P22, P23, the controller 509 outputs a notification signal to the notifier 506, and causes the notifier 506 to notify the user that the hour hand 301, the minute hand 302, and the second hand 303 have respectively arrived at the specified positions P21, P22, P23. In other words, the specified positions P21, P22, P23 are notification positions Q21, Q22, Q23 at which the controller 509 causes the notifier 506 to perform the notification operation.

The controller 509 causes the hour hand 301, the minute hand 302, and the second hand 303 to move to positions indicating the current time acquired from the external device, thereby making it possible to perform time correction for causing the watch 1 to display the accurate current time.

As a result of being provided with the configuration described above, the watch 1 according to Embodiment 3 demonstrates the same advantageous effects as the watch 1 according to Embodiment 1.

Next, a watch 1 according to Embodiment 4 is described. The configuration of the watch 1 according to Embodiment 4 is the same as that of the watch 1 according to Embodiment 1.

Next, processing whereby the controller 509 of the watch 1 according to Embodiment 4 causes the date wheel 304 to fast-forward move to a specified position is described. In one example, the specified position is a position indicating the current date that the controller 509 acquires from an external device, but is not limited thereto.

The controller 509 outputs a control signal to the drive circuit 502, and causes the date wheel 304 to fast-forward move to a specified position P24. When the date wheel 304 advances 31/360°, that is, an amount corresponding to one day, the controller 509 outputs a notification signal to the notifier 506, thereby causing the notifier 506 to notify the user that the date wheel 304 has advanced an amount corresponding to one day. In other words, a position every one day from the initial position of the date wheel 304 to the specified position P24 is the notification position Q24 at which the controller 509 causes the notifier 506 to perform the notification operation. The initial positon is the position at which the date wheel 304 is located before being caused to move to the specified position P24.

The controller 509 causes the date wheel 304 to move to a position indicating the current date acquired from the external device, thereby making it possible to perform date correction for causing the watch 1 to display the accurate date.

As a result of being provided with the configuration described above, the watch 1 according to Embodiment 4 demonstrates the same advantageous effects as the watch 1 according to Embodiment 1 or 2.

Next, a watch 1 according to Embodiment 5 is described. The configuration of the watch 1 according to Embodiment 5 is the same as that of the watch 1 according to Embodiment 1.

Next, processing whereby the controller 509 of the watch 1 according to Embodiment 5 causes the hour hand 301, the minute hand 302, or the second hand 303 to fast-forward move to specified positions is described. In one example, the specified position is 12 o'clock (zero minutes, zero seconds), but is not limited thereto.

The controller 509 outputs control signals to the drive circuit 502, and causes the hour hand 301, the minute hand 302, and the second hand 303 to fast-forward move to specified positions P11, P12, P13, respectively. As described above, the specified positions P11, P12, P13 are the 12th hour, 0 minutes, and 0 seconds positions, respectively. When the hour hand 301, the minute hand 302, and the second hand 303 all arrive at the respective notification positions Q11, Q12, Q13, the controller 509 outputs a notification signal to the notifier 506. The notification positions Q11, Q12, Q13 are positions at which the hour hand 301, the minute hand 302, and the second hand 303 indicate 11:55:00, but are not limited thereto. The controller 509 causes the notifier 506 to perform the notification operation, thereby notifying the user that the hour hand 301, the minute hand 302, and the second hand 303 have respectively approached the specified positions P11, P12, P13.

As a result of being provided with the configuration described above, the watch 1 according to Embodiment 5 demonstrates the same advantageous effects as the watch 1 according to Embodiment 1.

Modified Examples

Embodiments of the present disclosure are described above, but these embodiments are merely examples and do not limit the scope of application of the present disclosure. That is, various applications of the embodiments of the present disclosure are possible, and all embodiments are included in the scope of the present disclosure.

The notifier 506 may by capable of a plurality of types of notification operations, or may selectively use a plurality of notification operations. For example, a configuration is possible in which, when the notifier 506 includes a buzzer, a plurality of notification sounds is selectively used. A configuration is possible in which, when the notifier 506 includes a vibrator, a plurality of vibration patterns is selectively used. The controller 509 may selectively use the notification operations of the notifier 506 on the basis of the specified positions of the pointers. For example, a configuration is possible in which the controller 509 uses one notification operation when the hour hand 301, the minute hand 302, and the second hand 303 indicate a morning time, and another notification operation when the hour hand 301, the minute hand 302, and the second hand 303 indicate an afternoon time. Additionally, a configuration is possible in which a different notification operation is used each time the date wheel 304 advances an amount corresponding to one day.

In Embodiment 1, a description is given in which the controller 509 outputs the notification signal to the notifier 506 and causes the notifier 506 to perform a notification when all of the hour hand 301, the minute hand 302, and the second hand 303 have arrived at the respective specified positions P11, P12, P13. However, the present disclosure is not limited thereto. A configuration is possible in which the controller 509 repeatedly outputs the notification signal to the notifier 506 and causes the notifier 506 to perform the notification until the user inputs of the winding crown 401 and the switches 402, 403 are disabled.

In Embodiment 2, a description is given in which the controller 509 outputs the notification signal to the notifier 506 when the date wheel 304 advances an amount corresponding to one day. However, the present disclosure is not limited thereto. A configuration is possible in which the controller 509 outputs the notification signal to the notifier 506 when the date wheel 304 arrives at the specified position P14. A configuration is possible in which the controller 509 outputs the notification signal to the notifier 506 when the date wheel 304 advances an amount corresponding to one day and when the date wheel 304 arrives at the specified position P14. Furthermore, a configuration is possible in which the controller 509 changes the notification operation of the notifier 506 for when the date wheel 304 advances an amount corresponding to one day and for when the date wheel 304 arrives at the specified position P14.

It is possible to provide a watch that is provided in advance with configurations for realizing the functions according to the present disclosure, and it is also possible to apply a program to cause an existing watch to function as the watch according to the present disclosure. That is, a configuration is possible in which a CPU or the like that controls an existing watch is used to execute a program for realizing the functions of the watch described in the foregoing embodiments, thereby causing the existing watch to function as the watch according to the present disclosure. Additionally, a pointer control method according to the present disclosure can be implemented using the control device of the watch.

Any method may be used to apply the program. For example, the program can be applied by storing the program on a non-transitory computer-readable recording medium such as a flexible disc, a compact disc (CD) ROM, a digital versatile disc (DVD) ROM, and a memory card. Furthermore, the program can be superimposed on a carrier wave and applied via a communication medium such as the internet. For example, the program may be posted to and distributed via a bulletin board system (BBS) on a communication network. Moreover, a configuration is possible in which the processing described above is executed by starting the program and, under the control of the operating system (OS), executing the program in the same manner as other applications/programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A watch comprising:

a pointer configured to rotate and indicate a time;

a notifier configured to perform a notification operation to a user in a mode other than a visual mode;

a processor for controlling the rotation of the pointer and the notification operation of the notifier; and an input member configured to receive an operation by the user and transmit an input signal to the processor, wherein the processor is configured to:

control the pointer to cause the pointer to rotate faster than a rotation corresponding to a passage of time and move to a specified position;

when the pointer arrives at a notification position while the pointer is rotating faster than the rotation corresponding to the passage of time, control the notifier to cause the notifier to perform the notification operation; and after a set amount of time elapses after the pointer moves to the specified position, disable the input signal transmitted from the input member.

2. The watch according to claim 1, wherein the processor is configured to, after the set amount of time elapses after the pointer moves to the specified position, cause the pointer to move to a position indicating the time and cause the pointer to rotate according to the passage of time.

3. The watch according to claim 2, wherein the notification position exists between an initial position at which the pointer is located before being caused to move to the specified position, and the specified position.

4. The watch according to claim 3, wherein a plurality of the notification position exist at regular intervals between the initial position and the specified position.

5. The watch according to claim 1, wherein the notification position exists at a same position as the specified position.

6. The watch according to claim 1, wherein the notification position exists between an initial position at which the pointer is located before being caused to move to the specified position, and the specified position.

7. The watch according to claim 6, wherein a plurality of the notification position exist at regular intervals between the initial position and the specified position.

8. The watch according to claim 7, wherein the processor is configured to control the notifier to cause the notifier to perform different notification operations for when the pointer arrives at one of the plurality of the notification position, and when the pointer arrives at another one of the plurality of the notification position.

9. A pointer control method executed by a processor, the pointer control method comprising:

controlling a pointer to rotate and indicate a time;

controlling the pointer to cause the pointer to rotate faster than a rotation corresponding to a passage of time and move to a specified position;

when the pointer arrives at a notification position while the pointer is rotating faster than the rotation corresponding to the passage of time, controlling a notifier to cause the notifier to perform a notification operation to a user in a mode other than a visual mode; and after a set amount of time elapses after the pointer moves to the specified position, disabling an input signals transmitted from an input member.

10. A non-transitory computer-readable recording medium storing a program that causes a computer to at least perform:

control a pointer to rotate and indicate a time;

control the pointer to cause the pointer to rotate faster than a rotation corresponding to a passage of time and move to a specified position;

when the pointer arrives at a notification position while the pointer is rotating faster than the rotation corresponding to the passage of time, control a notifier to cause the notifier to perform a notification operation to a user in a mode other than a visual mode; and after a set amount of time elapses after the pointer moves to the specified position, disable an input signal transmitted from an input member.

* * * * *